United States Patent

[15] 3,638,750

Schmid

[45] Feb. 1, 1972

[54] RACK-STEERING MECHANISM WITH HYDRAULIC OR PNEUMATIC STEERING ASSISTANCE, PARTICULARLY FOR MOTOR VEHICLES

[72] Inventor: Leopold F. Schmid, Leharstrasse 8, 7000 Stuttgart 1, Germany

[22] Filed: Mar. 23, 1970

[21] Appl. No.: 21,587

[30] Foreign Application Priority Data

Apr. 8, 1969 Germany ...................... P 19 17 789.0

[52] U.S. Cl. ............................ 180/79.2 R, 92/98 RD, 92/99
[51] Int. Cl. ............................................................. B62d 5/10
[58] Field of Search .................... 180/79, 2 R; 92/98 RD, 99

[56] References Cited

UNITED STATES PATENTS

| | | | |
|---|---|---|---|
| 3,043,338 | 7/1962 | Hanson | 92/98 RD |
| 691,190 | 1/1902 | Sharp | 92/99 |
| 3,279,327 | 10/1966 | French | 92/99 X |
| 2,160,248 | 5/1939 | Colman | 92/99 X |

FOREIGN PATENTS OR APPLICATIONS 735,641 8/1955 Great Britain ...................... 180/79.2 R

*Primary Examiner*—Benjamin Hersh
*Assistant Examiner*—John A. Pekar
*Attorney*—Singer, Stern & Carlberg

[57] ABSTRACT

A rack-steering mechanism for a motor vehicle is provided with a hydraulic or pneumatic steering assistance comprising a piston formed by a tubular rolling bellows or diaphragm, one end of which is sealingly connected to the steering gear housing and the other end to the toothed rack extending axially through the steering gear housing. The end of the diaphragm connected to the toothed rack is provided with an annular enlargement through which the toothed rack extends. A ball and socket joint connected by a rack rod with the steering knuckle has a housing with an axial threaded projection thereon which is threadedly connected with one end of the toothed rack and locked thereto by a counternut which at the same time axially compresses the enlargement on the diaphragm and clamps it in sealing engagement with the toothed rack.

3 Claims, 5 Drawing Figures

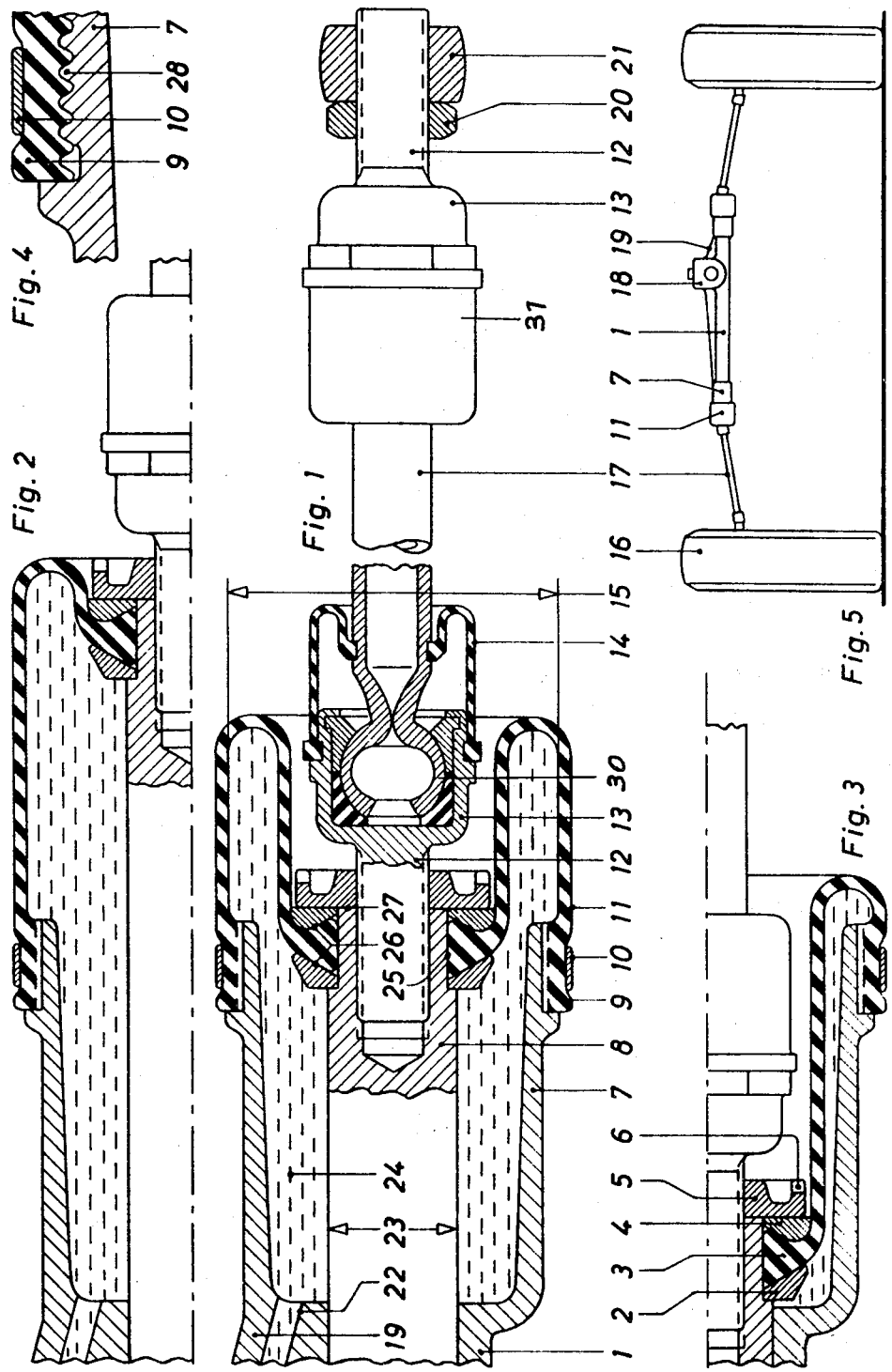

RACK-STEERING MECHANISM WITH HYDRAULIC OR PNEUMATIC STEERING ASSISTANCE, PARTICULARLY FOR MOTOR VEHICLES

The invention relates to a rack-steering mechanism with hydraulic or pneumatic steering assistance, particularly for motor vehicles, in which the steering assistance comprises a piston subjected to the pressure of a liquid or gaseous medium and sealed in the steering gear housing and connected with the toothed rack of the rack-steering mechanism.

In the known rack-steering mechanism the sealing between the steering gear housing and the piston connected with the toothed rack takes place by sliding packings.

It is known that sliding packing requires a great production expense because the sliding surfaces not only have to be produced with very narrow production tolerances, but must also have a special surface condition. Sliding packings also wear in the course of time, so that leakage losses occur, which may lead to an impaired function and when used with a hydraulic steering assistance device leads also to a local soiling of the vehicle. Furthermore, sliding packings on account of their sliding friction cause losses in the transmission efficiency of the steering mechanism and they require for that portion of the sliding surface of the rack which lies outside of the sliding packing a protection against soiling.

An object of the invention is to overcome these disadvantages which are present in these known types of rack steering mechanisms.

The object of the invention is to construct the piston on which the liquid or gaseous medium acts as a rolling bellows or diaphragm which consists of a flexible tubular member, made for example of rubber, whose inner end is connected with the toothed rack and whose outer end is connected liquidtight and gastight with the steering gear housing. The inner end of the diaphragm has an enlargement which is provided with a bore and has at least one conical end face. The liquid- and gastight connection of the inner end of the diaphragm with the toothed rack is created by an axial compression of the enlargement. The axial compression of the enlargement takes place by means of the counternut which is applied to an axially extending threaded pin on the housing of the ball and socket joint which secures the track rod against rotation. Grooves are used for producing a liquid- and gastight connection of the outer end of the tubular diaphragm with the steering gear housing.

An embodiment of the invention is shown in the drawing, and will be described in greater detail in the following description.

IN THE DRAWING

FIG. 1 shows a longitudinal section of one end of a rack-steering mechanism in accordance with the invention for a medium-heavy motor vehicle for passengers, approximately in a scale of 1:1 for straight driving;

FIG. 2 shows a partial longitudinal section corresponding to FIG. 1 when at maximum angle of turn the toothed rack is fully drawn out;

FIG. 3 shows a partial longitudinal section corresponding to FIG. 1 when at maximum angle of turn the toothed rack is fully pushed in;

FIG. 4 shows the connection of the outer end of the diaphragm with the steering gear housing on the scale of 2:1; and FIG. 5 shows the entire arrangement of the rack-steering mechanism in greatly reduced scale.

Referring to the drawing, the steering gear housing 1 is provided at both of its ends with a bell-shaped enlargement 7 to which is attached the cylindrical outer end 9 of the diaphragm 11 by means of a set of annular grooves 28 and a tension band 10 which clamps the end 9 into the grooves 28 in a liquid- and gastight manner (FIG. 4). The inner end of the diaphragm 11 has an annular enlargement 3 which is provided with two conical end faces 26 and a bore 25. Two rings 2, 4 which likewise have conical ends engage the conical end faces 26 and are axially urged against the enlargement 3 by a counternut 5 which also secures the threaded pin 12 on the housing 13 of the ball and socket joint 17 for the rack rod 17 against rotation. Owing to this axial clamping against the conical front faces 26, the wall of the bore 25 in the enlargement 3 is pressed against a seat provided on the toothed rack 8, so that a liquid- and gastight connection of the inner end of the rolling bellows 11 with the toothed rack 8 is produced. The counternut 5 is provided with radial grooves 6 adapted to be engaged by a tool for tightening the counternut 5. In order to eliminate for the tightening of the counternut any special skill, the enlargement 3 is so dimensioned that by means of a simple tightening of the counternut 5 against the rigid end face 27 of the rack 8 a liquid- and gastight connection is produced. The rack rod 17 has at both of its ends the same type of a ball and socket joint. The axially extending threaded pin 12 on the housing 13 of the inner ball and socket joint 30 is threaded into the toothed rack 8. The threaded pin 12 of the outer ball and socket joint 31 is threaded into the steering lever 21 connected with the steering knuckle and the counternut 20 secures it against rotation. 14 is a rubber cuff for sealing of the housing 13 against the rack rod 17. The liquid or gaseous medium 24 in customary manner is placed under pressure by a pump or a compressor, respectively, driven by the motor of the motor vehicle, and is controlled by a control device arranged in the control housing 18 of the steering gear housing 1 in a proper manner as required for the steering assistance. The feeding and discharge of the medium 24 takes place through a conduit 22 disposed in the rib 19 provided in the housing. Owing to the small outer diameter 23 of the toothed rack 8 and the large internal diameter 15 of the tubular rolling bellows 11, a very large active piston surface is produced. This large piston surface obtained with a small amount of weight results in small operating pressures and thereby produces a correspondingly small strain on the rolling bellows 11, which consists of rubber and is provided with reinforcement inserts.

The advantages of the device of the invention consist particularly in the employment of simple means for obtaining an effective seal which is not subject to wear, and still retains the liquid or gaseous medium sealed in the steering gear housing, without any noteworthy loss in efficiency. All this is attained with a very low amount of weight and a very large effective piston surface, while any sealing surfaces are eliminated which must be protected against contamination.

What I claim is:

1. A rack-steering mechanism for motor vehicles, said steering mechanism comprising steering linkage means including a toothed rack, a housing disposed about said toothed rack and defining a chamber with said toothed rack at each end of said housing, said chambers at each end of said housing each being closed by an annular diaphragm made from a flexible material and sealingly fixed at the outer diameter to said housing and sealingly fixed at the inner diameter to said toothed rack, and means for introducing fluid under pressure to said chambers to assist said steering linkage.

2. A rack-steering mechanism according to claim 1 wherein the inner diameter of said diaphragm connected to said toothed rack includes a bore bounded by an annular enlargement having at least one conical face, and wherein means fixing said end connected to said rack includes means engaging said conical face to axially compress said enlargement thereby to urge the latter into sealing engagement with said toothed rack.

3. A rack-steering mechanism according to claim 1, including a ball and socket joint with a rack rod thereon leading to a steering knuckle, said joint having a housing provided with an axially extending threaded extension threadedly connected with one end of said toothed rack, and a counternut on said threaded extension for locking said threaded extension to said toothed rack and for axially compressing said enlargement on said diaphragm to clamp the latter sealingly to said toothed rack.

* * * * *